United States Patent
Chokshi et al.

(10) Patent No.: US 9,473,518 B2
(45) Date of Patent: Oct. 18, 2016

(54) SECURING NETWORK COMMUNICATIONS WITH LOGICAL PARTITIONS

(75) Inventors: Shaival J. Chokshi, Austin, TX (US); Xiaohan Qin, Austin, TX (US); Rakesh Sharma, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1443 days.

(21) Appl. No.: 12/910,140

(22) Filed: Oct. 22, 2010

(65) Prior Publication Data

US 2012/0102562 A1  Apr. 26, 2012

(51) Int. Cl.
G06F 21/00 (2013.01)
H04L 29/06 (2006.01)
H04L 12/931 (2013.01)
G06F 21/53 (2013.01)

(52) U.S. Cl.
CPC .......... *H04L 63/1408* (2013.01); *H04L 49/70* (2013.01); *G06F 21/00* (2013.01); *G06F 21/53* (2013.01)

(58) Field of Classification Search
CPC ............................ G06F 21/00; H04L 63/1408
USPC .......................... 726/11, 12, 22, 23; 709/224
See application file for complete search history.

(56) References Cited

U.S. PATENT DOCUMENTS

| | | | |
|---|---|---|---|
| 7,313,667 B1 | 12/2007 | Pullela et al. | |
| 7,505,459 B2 | 3/2009 | Boyd | |
| 7,562,389 B1* | 7/2009 | Goyal et al. | 726/22 |
| 2006/0023709 A1* | 2/2006 | Hall et al. | 370/389 |
| 2006/0045089 A1* | 3/2006 | Bacher et al. | 370/392 |
| 2006/0123204 A1* | 6/2006 | Brown et al. | 711/153 |
| 2006/0195660 A1 | 8/2006 | Sundarrajan et al. | |
| 2008/0165774 A1 | 7/2008 | Huang et al. | |

* cited by examiner

*Primary Examiner* — Jeffrey Pwu
*Assistant Examiner* — Samuel Ambaye
(74) *Attorney, Agent, or Firm* — Yee & Associates, P.C.; Damion Josephs

(57) ABSTRACT

Embodiments of the present invention provide methods, systems, and computer program products that enable secure network communications with logical partitions. A gateway between a physical network adapter and at least one virtual network trunk adapter receives a packet. The gateway tags the packet with an indication of an origin of the packet. The gateway delivers the tagged packet to an intrusion prevention system for intrusion analysis. When the gateway receives the tagged packet from the intrusion prevention system, the gateway forwards the tagged packet according to the indication of origin of the tagged packet.

24 Claims, 5 Drawing Sheets

SECURING NETWORK COMMUNICATIONS WITH LOGICAL PARTITIONS

BACKGROUND

1. Technical Field

Embodiments of the present invention relate generally to the field of securing computer systems from network communication attacks, and more particularly to methods, systems, and computer program products for securing logical partitions or virtual machines from network communication attacks.

2. Description of Related Art

In the age of pervasive Internet availability, computer systems are under almost constant attack from a variety of sources, such as probes, scans, account compromises, root compromises, packet sniffers, denial of service attacks, exploitations of trust, malicious code, and Internet infrastructure attacks. Successful attacks may lead to serious consequences, such as loss of data, money, or confidential information, system downtime, and the like. Enterprises have strong desires to provide non-stop networking and protect their users and customers from attack.

There are a variety of systems designed to protect computer systems and networks from attacks. In addition to firewalls and the like, recently there have been developed intrusion prevention systems. An intrusion prevention system intercepts and analyzes every packet arriving at or departing from a computer connected to a network. If the intrusion prevention system deems a packet not to present an attack, the intrusion prevention system allows the packet to proceed. However, if the packet does represent an attack, the intrusion prevention system may either drop or modify the packet.

There is a trend in computing toward virtualized systems in which multiple virtual machines or logical partitions run on a single physical host system. Virtualized systems can provide many benefits, including consolidation to reduce hardware cost, optimization of workloads, and increased flexibility and responsiveness. Virtual machines or logical partitions share physical resources such as the physical network adapter of the host system. The architectures involved in the sharing of the physical network adapter among the virtual machines or logical partitions present challenges to the application of intrusion prevention systems to virtualized systems.

SUMMARY OF THE INVENTION

Embodiments of the present invention provide methods, systems, and computer program products that enable secure network communications with logical partitions. A gateway between a physical network adapter and at least one virtual network trunk adapter receives a packet. The gateway tags the packet with an indication of an origin of the packet. The gateway delivers the tagged packet to an intrusion prevention system for intrusion analysis. When the gateway receives the tagged packet from the intrusion prevention system, the gateway forwards the tagged packet according to the indication of origin of the tagged packet.

If the gateway receives the packet from the physical network adapter, the gateway tags the packet as originating at the physical network adapter. The gateway forwards packets received from the intrusion prevention system and tagged as originating at the physical network adapter to the at least one virtual network trunk adapter. In cases where the gateway is coupled to multiple virtual network trunk adapters, the gateway determines a virtual local area network (VLAN) identifier (ID) for the packet, and forwards the packet received from the intrusion prevention system to the virtual network trunk adapter associated with the VLAN ID.

If the gateway receives the packet from the at least one virtual network trunk adapter, the gateway tags the packet as originating at the at least one virtual network trunk adapter. The gateway forwards packets received from the intrusion prevention system and tagged as originating at the at least one virtual network trunk adapter to the physical network adapter.

If the gateway receives the packet from a socket layer, the gateway tags the packet as originating at the socket layer. When the gateway receives from the intrusion prevention system a packet tagged as originating at the socket layer, the gateway determines a destination media access control (MAC) address for the packet. The gateway delivers the packet to the at least one virtual network trunk adapter if the MAC address is an internal MAC address. The gateway delivers the packet to the physical network adapter if the MAC address is an external MAC address. If the gateway cannot determine whether the MAC address is internal or external, the gateway delivers the packet to both the physical adapter and one of the virtual adapters.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
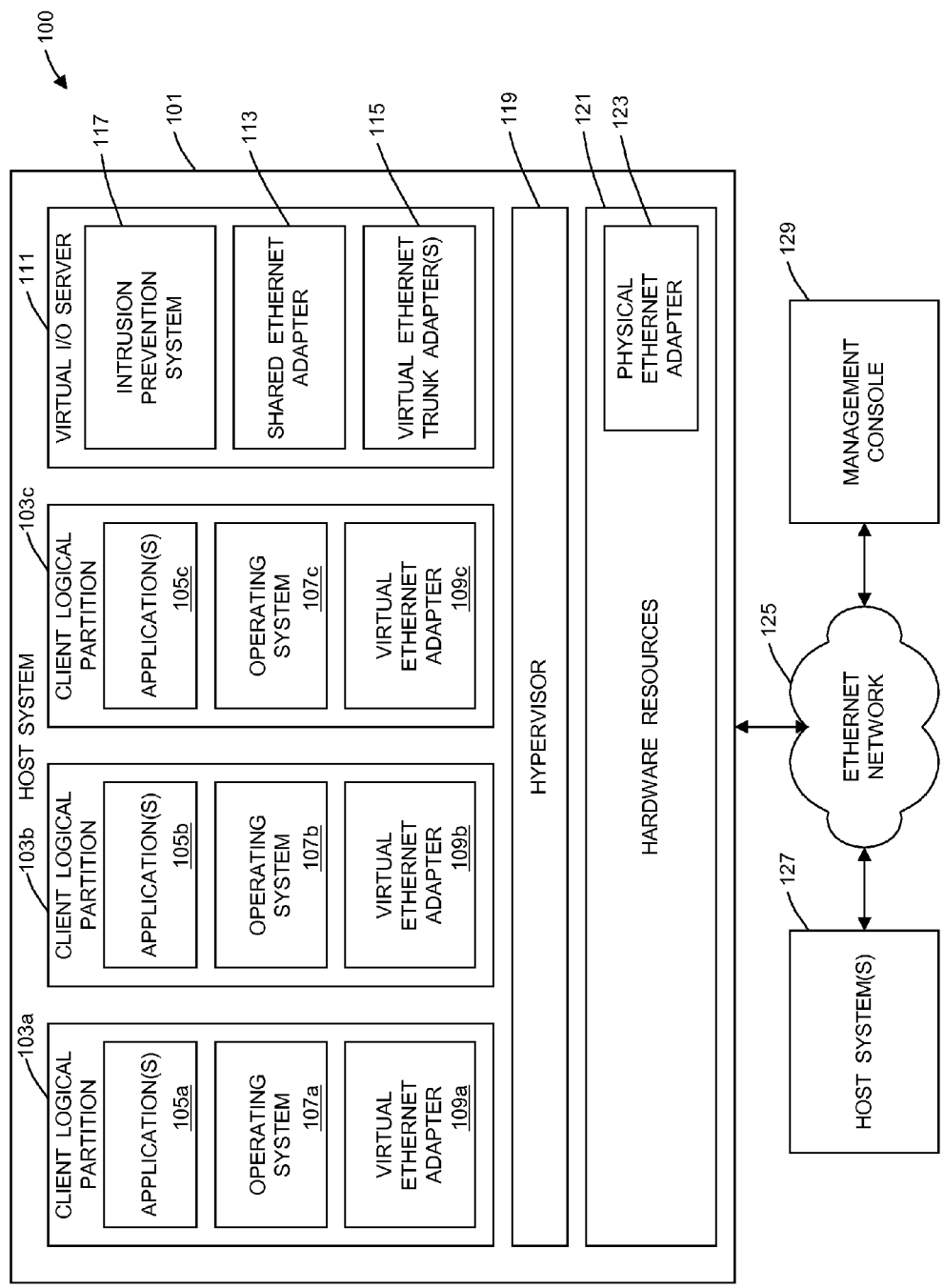
FIG. 1 is a block diagram of an embodiment of a system according to the present invention.

Referring now to drawings, and first to FIG. 1, an embodiment of a system according to the present invention is designated generally by the numeral 100. System 100 includes a host computer 101. Host computer 101 is a virtualized system that includes logical partitions 103 and a virtual I/O server 111. Logical partitions 103 are referred as client logical partitions in that they are clients of virtual I/O server 111. Client logical partitions 103 enable host system 101 to run as if it were three independent computers. Although three client logical partitions 103 are illustrated, it will be understood that a host computer 101 may host more or fewer logical partitions. Each client logical partition 103 includes, among other things, one or more applications 105, an operating system 107, and a virtual Ethernet adapter 109. Virtual Ethernet adapters 109 will be described in detail with reference to FIG. 2.

Virtual I/O server 111 is implemented in software that runs in a logical partition of host system 101. Virtual I/O server 111 facilitates the sharing of physical I/O resources between client logical partitions 103. Virtual I/O server 111 includes, among other things, a shared Ethernet adapter 113 and one or more virtual Ethernet trunk adapters 115, the respective functions of which will be described in detail with reference to FIG. 2. Virtual I/O server 111 also includes an intrusion prevention system 117.

Host system 101 includes a hypervisor 119. Hypervisor 119 provides the ability to divide physical hardware resources 121 of host system 101 among client logical partitions 103 and virtual I/O server 111. As will be described in detail with reference to FIG. 2, hypervisor provides one or more virtual local switches to enable communication among client logical partitions 103 and virtual I/O server 111. Hardware resources 121 include, among other things, a physical Ethernet adapter 123.

System 100 includes an Ethernet network, indicated generally at 125, connected to host system 101. Ethernet network 125 is coupled to one or more other host systems 127. System 100 may also include a management console 129, which is used to configure host systems 101 and 127.

Figure 2:
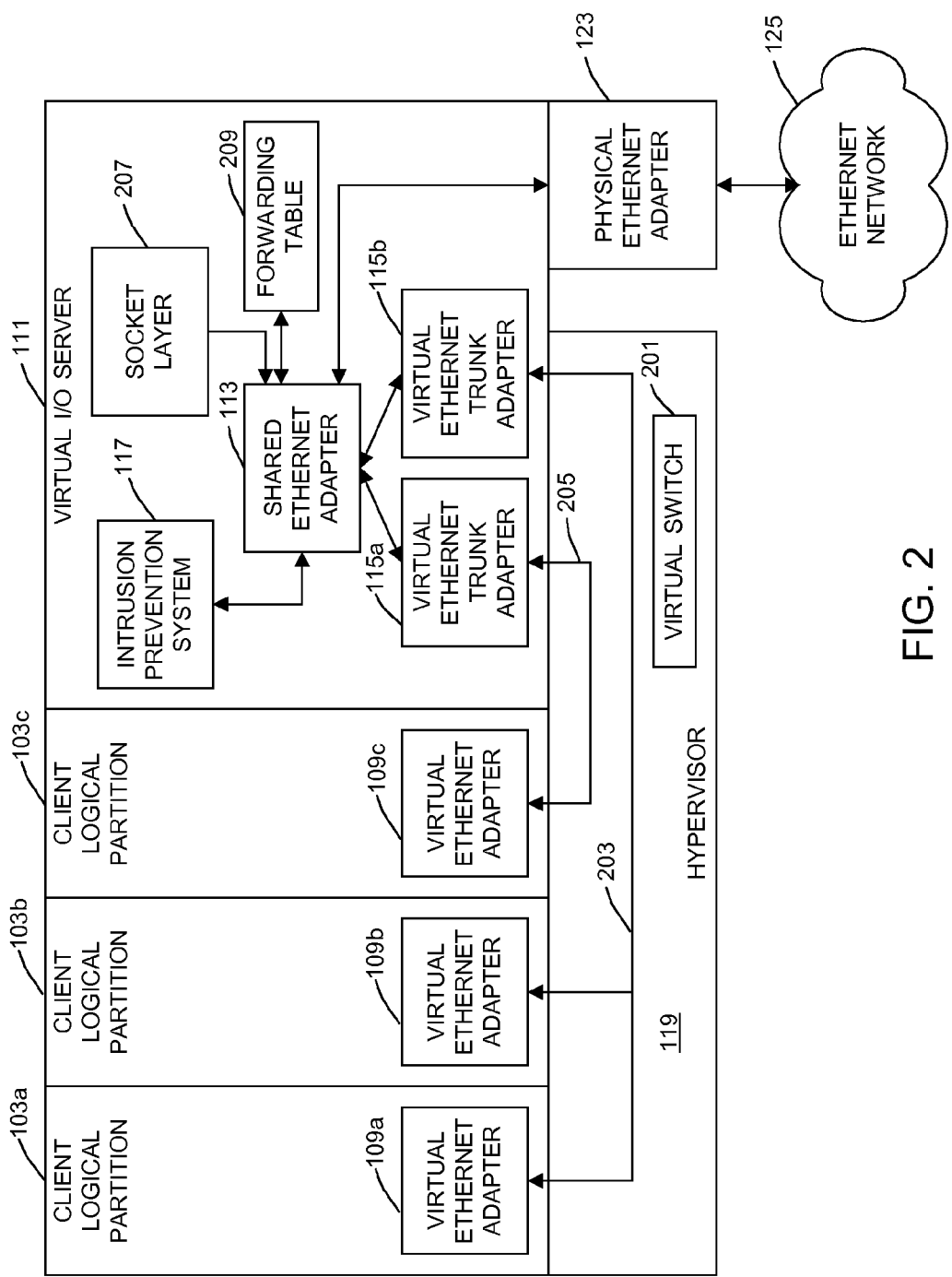
FIG. 2 is a functional block diagram of an embodiment of a system according to the present invention.

Referring now to FIG. 2, there is illustrated a functional block diagram of an embodiment of a system according to the present invention. Hypervisor 119 includes a virtual switch 201, which enables inter-partition communication through VLANs 203 and 205. VLAN 203 interconnects virtual Ethernet adapter 109a, virtual Ethernet adapter 109b, and virtual Ethernet trunk adapter 115b, and VLAN 205 interconnects virtual Ethernet adapter 109c and virtual Ethernet trunk adapter 115a. Virtual switch 201 complies with the IEEE 802.1Q standard. Ethernet packets are tagged with their VLAN membership information and their delivery is restricted to members of their VLAN. The VLAN tag information is referred to as a VLAN ID or VID.

Shared Ethernet adapter 113 of virtual I/O server 111 provides an Open Systems Interconnection (OSI) model layer 2 (data link layer) bridge between VLANs 203 and 205 and physical Ethernet network 125. Shared Ethernet adapter 113 is also adapted to bridge outgoing packets that originate from a socket layer 207 of virtual I/O server to VLANs 203 or 205, or to physical Ethernet network 125. Shared Ethernet adapter 113 accesses a forwarding table 209 of media access control (MAC) destination addresses to determine how to forward packets received from socket layer 207.

In embodiments of the present invention, shared Ethernet adapter 113 forwards all packets that it receives, whether from socket layer 207, virtual Ethernet trunk adapters 115a or 115b, or physical Ethernet adapter 123, to intrusion prevention system 117 for security scanning. In the embodiments of FIG. 1 and FIG. 2, intrusion prevention system 117 is implemented in software running on virtual I/O server 111. However, in other embodiments, an intrusion prevention system may be embodied as an appliance, separate from host system 101.

Intrusion prevention system 117 analyzes each packet that it receives from shared Ethernet adapter 113 to determine if the packet contains viruses or other forms of attack. Intrusion prevention system 117 may return packets known not to be malicious synchronously to shared Ethernet adapter 113 or it may retain packets for in-depth analysis. In depth analysis by intrusion prevention system 117 may reveal that a packet is not harmful, in which case intrusion prevention system 117 returns the packet asynchronously to shared Ethernet adapter 113. If intrusion prevention system 117 determines that a packet is malicious, it may either drop the packet or modify the packet so as to confuse the malicious attacker and return the modified packet asynchronously to shared Ethernet adapter 113.

In order to forward a packet received from intrusion prevention system 117, shared Ethernet adapter 113 needs to know where packet originated. Accordingly, prior to passing a packet to intrusion prevention system 117, shared Ethernet adapter 113 tags the packet with an indication of the origin of the packet. An embodiment of shared Ethernet adapter 113 packet processing is illustrated in FIGS. 3A-B.

Figure 3A:
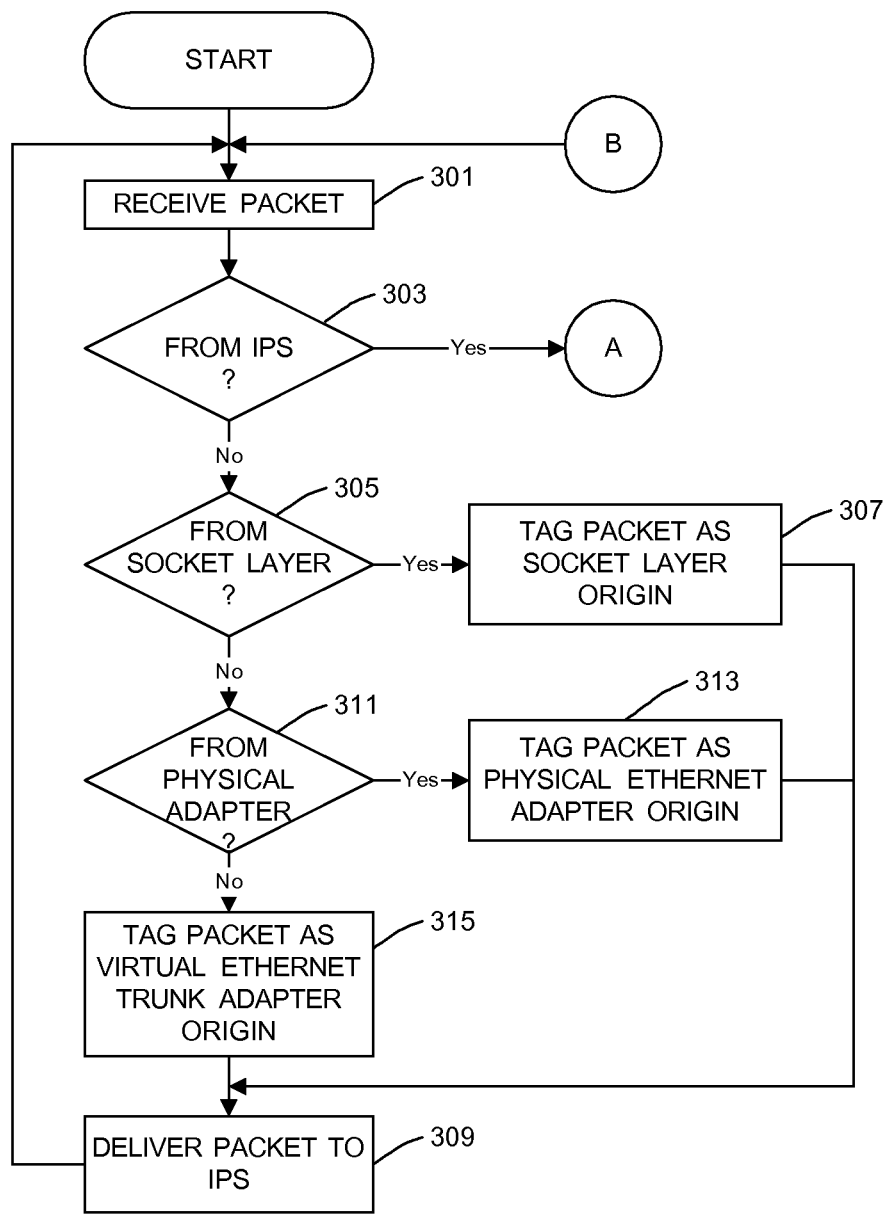
FIGS. 3A and 3B comprise a flowchart of an embodiment of processing according to the present invention; and, FIG. 4 is a block diagram of a computing device in which features of the present invention may be implemented.

Referring to FIG. 3A, shared Ethernet adapter 113 receives a packet, at block 301. Shared Ethernet adapter 113 determines, at decision block 303, if the packet was received from intrusion prevention system (IPS) 117. If not, shared Ethernet adapter 113 determines, at decision block 305, if the packet was received from socket lay 207. If so, shared Ethernet adapter 113 tags the packet as originating from the socket layer, at block 307, and delivers the packet to IPS 117, at block 307, whereupon processing returns to block 301. If, as determined at decision block 305, the packet was not received from socket layer 207, shared Ethernet adapter 113 determines, at decision block 311, if the packet was received from physical Ethernet adapter 123. If so, shared Ethernet adapter 113 tags the packet as originating from the physical Ethernet adapter, at block 313, and delivers the tagged packet to IPS 117, at block 309. If, as determined at decision block 311, the packet was not received from physical Ethernet adapter 123, shared Ethernet adapter 113 tags the packet as originating from a virtual Ethernet trunk adapter 115, at block 315, and delivers the tagged packet to IPS 117, at block 309.

Figure 3B:
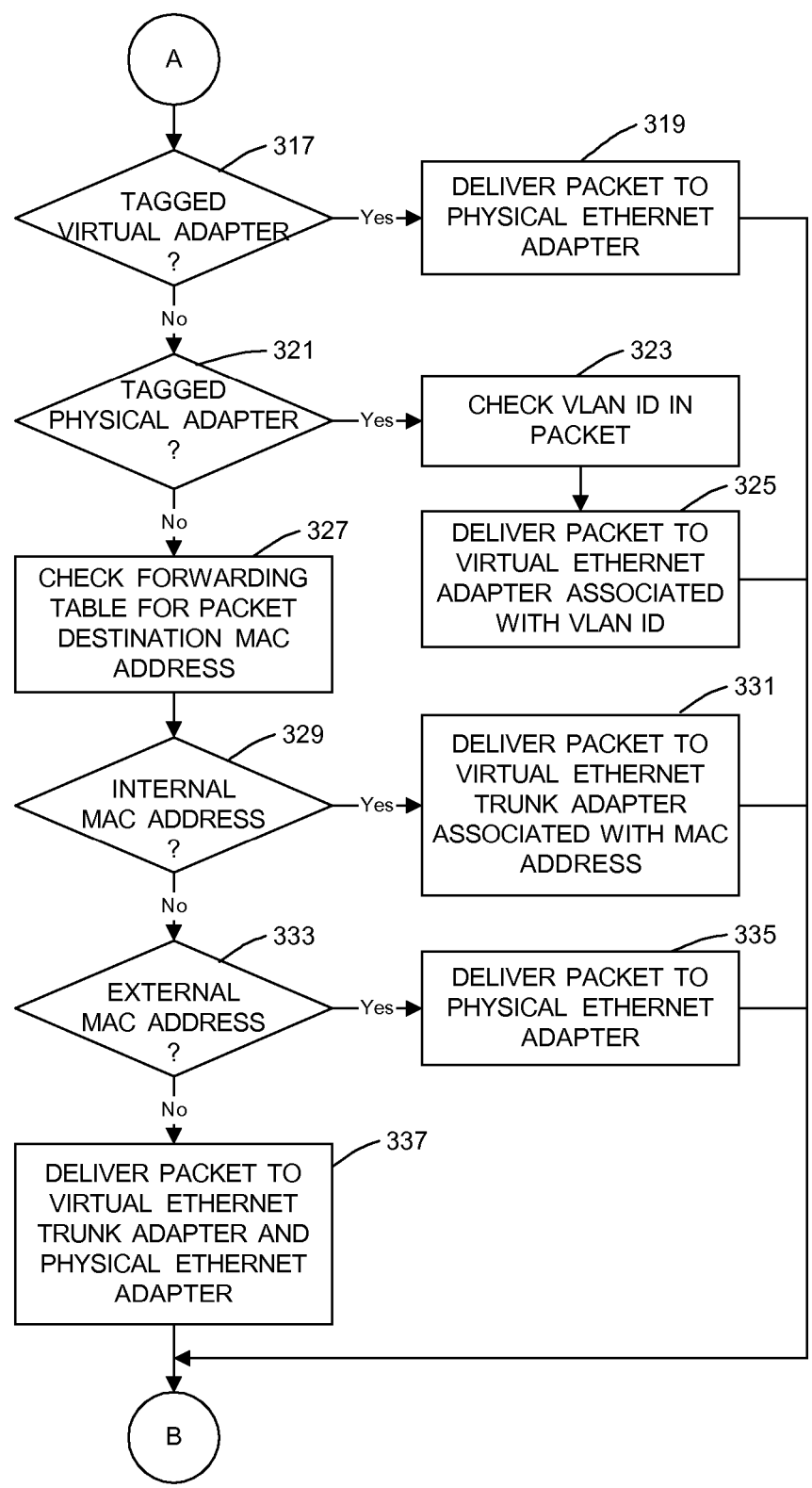

Returning to decision block 303, if shared Ethernet adapter 113 determines that the packet received at block 301 was received from IPS 117, processing proceeds to FIG. 3B. Referring to FIG. 3B, shared Ethernet adapter 113 determines, at decision block 317, if the packet is tagged as originating at a virtual Ethernet trunk adapter 115. If so, shared Ethernet adapter 113 delivers the packet to physical Ethernet adapter 123, and processing returns to block 301 of FIG. 3A. If, as determined at decision block 317, the packet is not tagged as originating at a virtual Ethernet trunk adapter 115, shared Ethernet adapter 113 determines, at decision block 312, if the packet is tagged as originating from physical adapter 123. If so, shared Ethernet adapter 113 checks the VLAN ID of the packet, at block 323, and delivers the packet to the virtual Ethernet trunk adapter associated with the VLAN ID, at block 325. If, as determined at decision block 321, the packet is not tagged as originating at physical Ethernet adapter 123, which indicates that the packet originated from socket layer 207, shared Ethernet adapter 113 checks forwarding table 209 for the packet's destination MAC address, at block 327. If, as determined at decision block 329, forwarding table 209 lists the destination MAC address of the packet as internal to host system 101, shared Ethernet adapter 113 delivers the packet to the virtual Ethernet trunk adapter 115 associated with the destination MAC address of the packet. If, as determined at decision block 333, forwarding table 207 lists the destination MAC address of the packet to be external to host system 101, shared Ethernet adapter 113 delivers the packet to physical Ethernet adapter 123, at block 335. If, as determined at decision blocks 329 and 333, the destination MAC address of the packet is not listed in forwarding table, shared Ethernet adapter 113 delivers copies of the packet to virtual Ethernet trunk adapters 115 and physical Ethernet adapter 123, at block 337.

Figure 4:
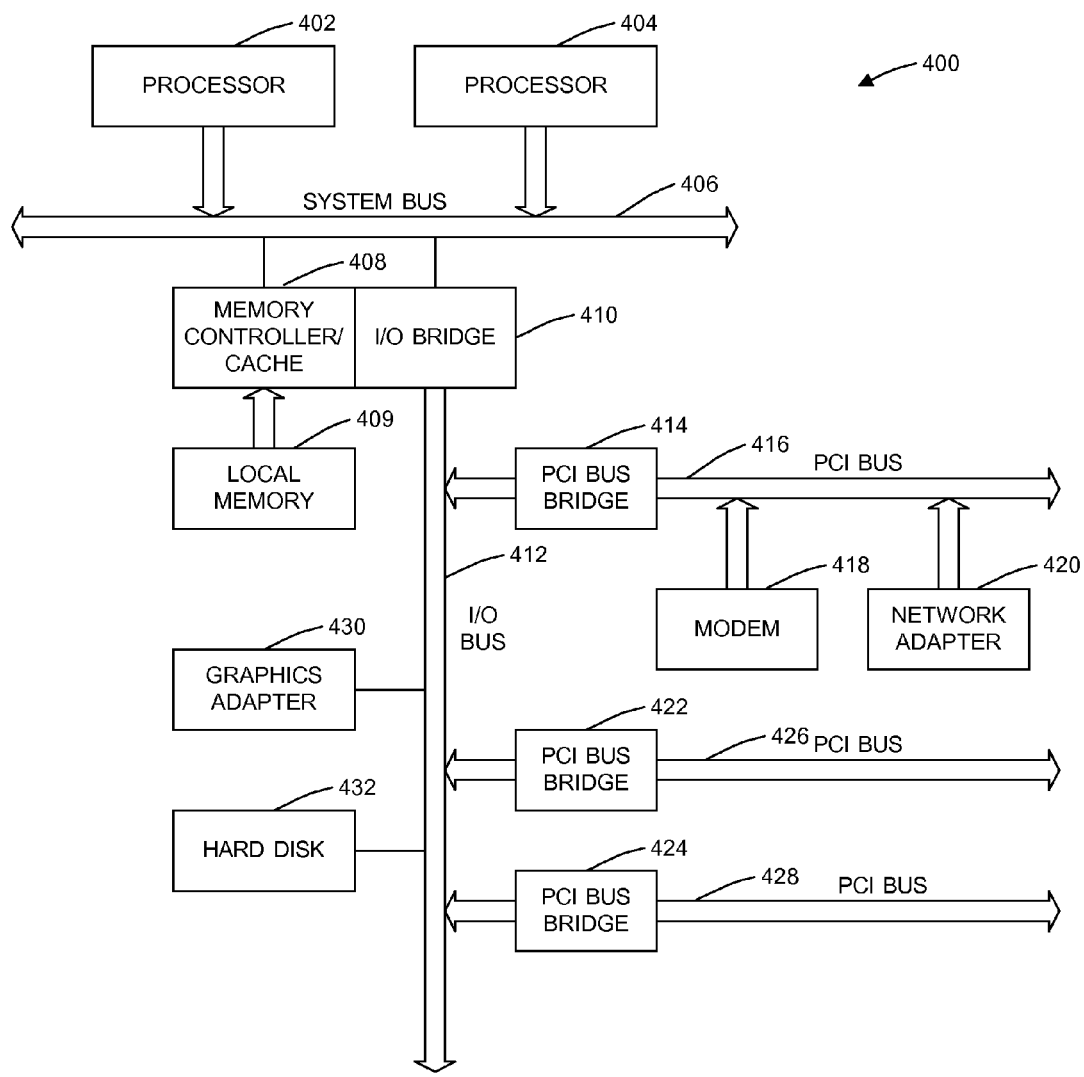

Referring to FIG. 4, a block diagram of a data processing system 400 that may implement a system, such as host system 101 in FIG. 1, is depicted. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to network 109 in FIG. 1 may be provided through modem 418 and network adapter 420 connected to PCI local bus 416 through add-in boards. Additional PCI bus bridges 422 and 424 provide interfaces for additional PCI local buses 426 and 428, respectively, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM eServer pSeries system, a product of International Business Machines Corporation in Armonk, N.Y., running the Advanced Interactive Executive (AIX) operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of enabling secure network communications with logical partitions, which comprises:
    receiving a packet at a gateway between a physical network adapter and at least one virtual network adapter;
    tagging said packet, by the gateway, with an indication of an origin of said packet;
    delivering, by the gateway, said tagged packet to an intrusion prevention system;
    receiving, by the gateway, said tagged packet from said intrusion prevention system; and,
    forwarding, by the gateway, said tagged packet received from said intrusion prevention system according to said indication of origin of said tagged packet.

2. The method as claimed in claim 1, wherein said tagging, by the gateway, comprises:
    tagging said packet as originating at said physical network adapter if said packet is received at said gateway from said physical network adapter.

3. The method as claimed in claim 2, wherein said forwarding, by the gateway, comprises:
    forwarding said tagged packet received from said intrusion prevention system to said at least one virtual network adapter if said packet is tagged as originating at said physical network adapter.

4. The method as claimed in claim 2, wherein, if said packet is tagged as originating at said physical network adapter, said forwarding comprises:
    determining a virtual local area network (VLAN) identifier (ID) for said packet, by the gateway; and,
    forwarding, by the gateway, said packet received from said intrusion prevention system to an at least one virtual network trunk adapter associated with said VLAN ID.

5. The method as claimed in claim 1, wherein said tagging, by the gateway, comprises:
    tagging said packet as originating at said virtual network adapter if said packet is received at said gateway from said virtual network adapter.

6. The method as claimed in claim 5, wherein said forwarding, by the gateway, comprises:
    forwarding said tagged packet received from said intrusion prevention system to said physical network adapter if said packet is tagged as originating at said virtual network adapter.

7. The method as claimed in claim 1, wherein said tagging, by the gateway, comprises:
    tagging said packet as originating at a socket layer if said packet is received at said gateway from said socket layer.

8. The method as claimed in claim 7, wherein, if said packet received from said intrusion prevention system is tagged as originating at said socket layer, said forwarding comprises:
    determining, by the gateway, a destination media access control (MAC) address for said packet;
    delivering, by the gateway, said packet to said virtual network trunk adapter if said MAC address is an internal MAC address; and,
    delivering, by the gateway, said packet to said physical network adapter if said MAC address is an external MAC address.

9. A system, for enabling secure network communications with logical partitions, comprising:
    a host computer, said host computer including a physical network adapter;
    at least one virtual machine running on said host computer, said at least one virtual machine having a connection to a virtual network adapter;
    a gateway running on said host computer, said gateway having a connection to said physical network adapter and a connection to at least one virtual network trunk adapter;
    a virtual local area network between said virtual network adapter of said at least one virtual machine and said virtual network trunk adapter of said gateway;
    an intrusion prevention system coupled to said gateway;
    said gateway
    tagging a packet received at said gateway with an indication of an origin of said packet;
    delivering said tagged packet to the intrusion prevention system; and, forwarding said tagged packet received from said intrusion prevention system according to said indication of origin of said tagged packet.

10. The system as claimed in claim 9, wherein said tagging comprises:
tagging, by said gateway, said packet as originating at said physical network adapter if said packet is received at said gateway from said physical adapter.

11. The system as claimed in claim 10, wherein, if said packet is tagged as originating at said physical network adapter, said forwarding comprises:
forwarding, by said gateway, said tagged packet received from said intrusion prevention system to said at least one virtual network trunk adapter.

12. The system as claimed in claim 10, wherein, if said packet is tagged as originating at said physical network adapter, said forwarding comprises:
determining, by said gateway, a virtual local area network (VLAN) identifier (ID) for said packet; and,
forwarding, by said gateway, said packet received from said intrusion prevention system to an at least one virtual network trunk adapter associated with said VLAN ID.

13. The system as claimed in claim 9, wherein said tagging comprises:
tagging, by said gateway, said packet as originating at said at least one virtual network trunk adapter if said packet is received at said gateway from said at least one virtual network trunk adapter.

14. The system as claimed in claim 12, wherein said forwarding comprises:
forwarding, by said gateway, said tagged packet received from said intrusion prevention system to said physical network adapter if said packet is tagged as originating at said virtual network trunk adapter.

15. The system as claimed in claim 9, wherein said tagging comprises:
tagging, by said gateway, said packet as originating at a socket layer if said packet is received at said gateway from said socket layer.

16. The system as claimed in claim 15, wherein, if said packet received from said intrusion prevention system is tagged as originating said socket layer, said forwarding comprise:
determining, by said gateway, a destination media access control (MAC) address for said packet;
delivering, by said gateway, said packet to said virtual network trunk adapter if said MAC address is an internal MAC address; and,
delivering, by said gateway, said packet to said physical network adapter if said MAC address is an external MAC address.

17. A computer program product for enabling secure network communications with logical partitions, said computer program product comprising:
a computer readable storage device having computer readable program code stored thereon for execution by a computer, the computer readable program code comprising:
computer readable instructions for tagging a packet received at a gateway between a physical network adapter and at least one virtual network adapter with an indication of an origin of said packet;
computer readable instructions for delivering said tagged packet to an intrusion prevention system;
computer readable instructions for receiving said tagged packet from said intrusion prevention system; and,
computer readable instructions for forwarding said tagged packet received from said intrusion prevention system according to said indication of origin of said tagged packet.

18. The computer program product as claimed in claim 17, wherein said computer readable instructions stored in said computer readable storage device for tagging comprise:
computer readable instructions stored in said computer readable storage device for tagging said packet as originating at said physical network adapter if said packet is received at said gateway from said physical network adapter.

19. The computer program product as claimed in claim 18, wherein said instructions stored in said computer readable storage device for forwarding comprise:
computer readable instructions stored in said computer readable storage device for forwarding said tagged packet received from said intrusion prevention system to said at least one virtual network adapter if said packet is tagged as originating at said physical network adapter.

20. The method as claimed in claim 18, wherein, if said packet is tagged as originating at said physical network adapter, said instructions stored in said computer readable storage device for forwarding comprise:
computer readable instructions stored in said computer readable storage device for determining a virtual local area network (VLAN) identifier (ID) for said packet; and,
computer readable instructions stored in said computer readable storage device for forwarding said packet received from said intrusion prevention system to an at least one virtual network trunk adapter associated with said VLAN ID.

21. The method as claimed in claim 17, wherein said instructions stored in said computer readable storage device for tagging comprise:
computer readable instructions stored in said computer readable storage device for tagging said packet as originating at said virtual network adapter if said packet is received at said gateway from said virtual network adapter.

22. The method as claimed in claim 21, wherein said instructions stored in said computer readable storage device for forwarding comprise:
computer readable instructions stored in said computer readable storage device for forwarding said tagged packet received from said intrusion prevention system to said physical network adapter if said packet is tagged as originating at said virtual network adapter.

23. The method as claimed in claim 17, wherein said instructions stored in said computer readable storage device for tagging comprise:
computer readable instructions stored in said computer readable storage device for tagging said packet as originating at a socket layer if said packet is received at said gateway from said socket layer.

24. The method as claimed in claim 23, wherein, if said packet received from said intrusion prevention system is tagged as originating said socket layer, said instructions stored in said computer readable storage device for forwarding comprise:
computer readable instructions stored in said computer readable storage device for determining a destination media access control (MAC) address for said packet;
computer readable instructions stored in said computer readable storage device for delivering said packet to said virtual network trunk adapter if said MAC address is an internal MAC address; and, computer readable instructions stored in said computer readable storage device for delivering said packet to said physical network adapter if said MAC address is an external MAC address.

\* \* \* \* \*